United States Patent
Fishler

(10) Patent No.: US 10,873,186 B2
(45) Date of Patent: Dec. 22, 2020

(54) ELECTRICAL GRID SOLAR ENERGY HARVESTING SYSTEM

(71) Applicant: Yehoshua Fishler, Shoham (IL)

(72) Inventor: Yehoshua Fishler, Shoham (IL)

( * ) Notice: Subject to any disclaimer, the term of this patent is extended or adjusted under 35 U.S.C. 154(b) by 0 days.

(21) Appl. No.: 15/356,941

(22) Filed: Nov. 21, 2016

(65) Prior Publication Data

US 2017/0070052 A1 Mar. 9, 2017

Related U.S. Application Data

(63) Continuation-in-part of application No. 13/378,403, filed as application No. PCT/IL2010/000472 on Jun. 15, 2010, now abandoned.

(60) Provisional application No. 61/187,060, filed on Jun. 15, 2009.

(51) Int. Cl.
| | | |
|---|---|---|
| H02J 3/38 | (2006.01) | |
| H02S 20/30 | (2014.01) | |
| H02S 40/22 | (2014.01) | |
| H02S 20/00 | (2014.01) | |
| H02S 40/42 | (2014.01) | |

(52) U.S. Cl.
CPC .............. *H02J 3/383* (2013.01); *H02S 20/00* (2013.01); *H02S 20/30* (2014.12); *H02S 40/22* (2014.12); *H02S 40/425* (2014.12); *Y02E 10/52* (2013.01); *Y02E 10/56* (2013.01)

(58) Field of Classification Search
None
See application file for complete search history.

(56) References Cited

U.S. PATENT DOCUMENTS

| | | | |
|---|---|---|---|
| 4,297,521 A | 10/1981 | Johnson | |
| 5,212,916 A | 5/1993 | Dippel et al. | |
| 6,093,884 A | 7/2000 | Toyomura et al. | |
| 6,594,929 B2 | 7/2003 | Butcher | |
| 6,655,917 B1 | 12/2003 | Lee et al. | |
| 7,285,719 B2 * | 10/2007 | Conger | F24S 25/50 |
| | | | 136/245 |
| 8,641,214 B1 | 2/2014 | Batchko | |
| 2003/0111103 A1 | 6/2003 | Bower et al. | |
| 2005/0003524 A1 | 2/2005 | Conger | |
| 2006/0004268 A1 | 3/2006 | Korman | |

(Continued)

FOREIGN PATENT DOCUMENTS

| | | |
|---|---|---|
| CA | 2004980 A1 | 6/1990 |
| DE | 4038646 A1 | 6/1992 |

(Continued)

*Primary Examiner* — Devina Pillay
(74) *Attorney, Agent, or Firm* — Birch, Stewart, Kolasch & Birch, LLP

(57) ABSTRACT

Provided is a grid-mounted solar energy harvesting system, wherein the grid is operable to supply AC power independently of the solar energy system and comprises at least two pylons supporting one or more power lines, the solar energy harvesting system comprising: One or more solar panels longitudinally disposed between the at least two pylons, wherein at least one of the one or more solar panels is supported by two support cables extended between and attached to the at least two pylons and comprise one of the one or more power lines and one dummy line which is electrically conductive and is electrically connected in at least one point along the solar energy harvesting system to the power line.

15 Claims, 7 Drawing Sheets

(56) References Cited

U.S. PATENT DOCUMENTS

| | | |
|---|---|---|
| 2006/0042681 A1* | 3/2006 | Korman ............ H01L 31/052 136/251 |
| 2006/0207192 A1* | 9/2006 | Durham ............ E04B 1/3416 52/73 |
| 2008/0061193 A1 | 3/2008 | Conger |
| 2008/0135095 A1 | 6/2008 | Cummings et al. |
| 2008/0030235 A1 | 12/2008 | Denault |
| 2009/0146501 A1 | 6/2009 | Cyrus |
| 2010/0031996 A1 | 2/2010 | Basol |
| 2010/0116325 A1 | 5/2010 | Nikoonahad |
| 2010/0326522 A1 | 12/2010 | Okaniwa |

FOREIGN PATENT DOCUMENTS

| | | |
|---|---|---|
| DE | 4431154 A1 | 3/1996 |
| JP | 2004235188 A | 8/2004 |
| JP | 2006283742 A | 10/2006 |
| KR | 2008065818 A | 7/2008 |
| WO | 2006130892 A1 | 12/2006 |

* cited by examiner

ELECTRICAL GRID SOLAR ENERGY HARVESTING SYSTEM

RELATED APPLICATION/S

This application is a continuation-in-part of U.S. patent application Ser. No. 13/378,403, filed Jan. 26, 2012, which claims the benefit of U.S. Provisional Application No. 61/187,060 filed on 15 Jun. 2009, the disclosures of which are incorporated herein by reference in their entirety. The contents of the above document are incorporated by reference as if fully set forth herein.

FIELD AND BACKGROUND OF THE INVENTION

The present invention, in some embodiments thereof, relates to system for harvesting solar energy and, more particularly, but not exclusively, to a system and a method for harvesting different forms of energy, including solar energy, through an electrical grid.

Harvesting of solar energy is an alternative form of producing renewable non-polluting energy for the production of electricity instead of using non-renewable energy resources such as coal and oil that generate pollution. The main technologies presently used for harvesting solar energy include use of photovoltaic cells which convert solar energy into electricity using photoelectric effect, and concentrating sunlight into a beam using mirrors which are focused to a central point which includes a plant for generating electricity from the heat of the concentrated beam.

Some types of facilities for harvesting solar energy include solar energy farms which may use large numbers of solar panels with photovoltaic cells and/or large number of mirrors to concentrate the sunlight. These farms generally require large tracts of land to accommodate the large number of panels and/or mirrors, which generally are connected to structures which allow tracking of the sun. Some of the tracking structures include rotary motion and tilting of the panels and/or mirrors. Others include cable-based tracking systems. One such cable-based tracking system is described in "SOLAR WINGS A NEW LIGHTWEIGHT PV TRACKING SYSTEM", F. P. Baumgartner et al., 23$^{rd}$ EU PVSEC, Valencia 2008-09-04; and in "EXPERIENCES WITH CABLE-BASED SOLAR WINGS TRACKING SYSTEM AND PROGRESS TOWARD TWO-AXIS LARGE SCALE SOLAR SYSTEM", F. P. Baumgartner et al., Proceedings of the 24$^{th}$ European Photovoltaic Solar Energy Conference, Hamburg 21 Sep. 2009.

Additional background art includes U.S. Pat. Nos. 5,241,147 and 5,965,956.

SUMMARY OF THE INVENTION

A grid-mounted solar energy harvesting system, wherein the grid is operable to supply AC power independently of the solar energy system and comprises at least two pylons supporting one or more power lines, the solar energy harvesting system comprising: One or more solar panels longitudinally disposed between the at least two pylons, wherein at least one of the one or more solar panels is supported by two support cables extended between and attached to the at least two pylons and comprise one of the one or more power lines and one dummy line which is electrically conductive and is electrically connected in at least one point along the solar energy harvesting system to the power line.

In some embodiments, at least one of the one or more solar panels is longitudinally disposed along at least a portion of a length of the two support cables.

In some embodiments, the system is adapted to harvest heat.

In some embodiments, the at least one of the one or more solar panels comprises a photovoltaic module. In some of these embodiments the photovoltaic module is adapted to concentrate solar energy. The photovoltaic module is attached, in some embodiments, to an electrically insulating material. In some of these embodiments, the electrically insulating material comprises an electrically insulating flexible membrane. In some embodiments, at least part of the two support cables is embedded in the electrically insulating material. In some embodiments, the electrically insulating material comprises a cavity containing a fluidic gas. In some of these embodiments, the fluidic gas is a lighter-than-air gas and/or exhibits fluorescent properties.

In some embodiments, the system further comprising clips for attaching the at least one of the one or more solar panels to the two support cables. In some of these embodiments, the clips comprise an electrically insulating material.

In some embodiments, the at least one of the one or more solar panels are configured to emit light.

In some embodiments, the system further comprising an additional support cable extending between said at least two pylons, for supporting from above a weight of the at least one of the solar panels, and tension cables for connecting the at least one of the one or more solar panels to the additional support cable.

In some embodiments, the at least one of the one or more solar panels comprises a reflective cover for reflecting solar energy.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
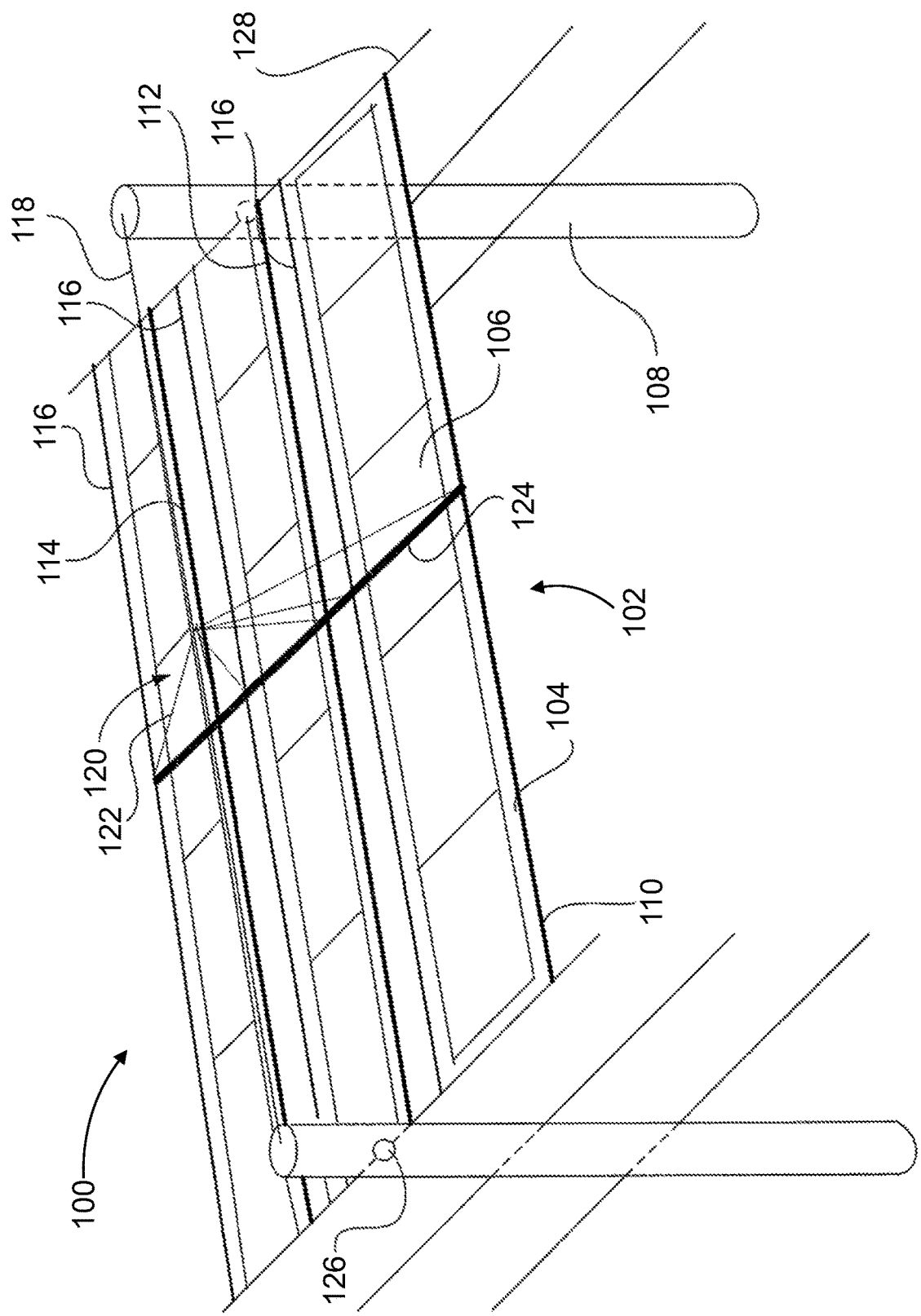
FIG. 1 schematically illustrates a perspective view of an exemplary electrical grid solar harvesting system, according to an embodiment of the present invention.

The present invention, in some embodiments thereof, relates to system for harvesting solar energy and, more particularly, but not exclusively, to a system and a method for harvesting different forms of energy, including solar energy, through an electrical grid.

An aspect of some embodiments of the present invention relates to a solar energy harvesting system where the solar panels are deployed on power lines of an electrical grid for generating electricity, wherein the grid is operable to supply AC power independently of the solar energy harvesting system. The power lines may include high voltage lines, medium voltage lines, and low voltage lines, any may form part of a national grid, regional grid, district grid, or local grid. Optionally, the power lines may be mounted on electricity steel pylons, lighting pylons or other type of pylons suitable for supporting power lines, including cement pylons, wooden pylons, and the like. A distance between pylons will generally be according to the topography, generally about 40 meters. Optionally, the pylons requires strengthening for mounting the panels on the power lines. A distinct advantage of installing the panels onto the power lines, in accordance with some embodiments of the invention, is a potential substantial savings in infrastructural investment and maintenance typically associated with a solar energy farm. The panels may extend longitudinally along any length of the electrical grid eliminating a need for large tracts of land on which to set up the panels. Optionally or alternatively, a need for large, cumbersome, tracking structures onto which the panels are mounted is avoided.

In some embodiments, one or multiple inverters convert the direct current (DC) output of the panels to alternating current (AC), which can be fed into the electrical grid. This can be performed essentially at any point along the grid (as the panels are on the power lines). This can eliminate a need for long distance cables frequently used to connect the inverter in the farm to the grid, possibly allowing for greater power to be delivered into the grid (power is lost along the way) and reducing the costs associated with the connection to the grid (cost of the cable and laying the cable, maintenance, etc.). In some embodiments, the electric grid may serve to store the power delivered into the grid by the system. Optionally, the grid may store the power delivered by a plurality of systems remotely located from one another as if they were from one large system. Optionally, the grid can store the power delivered by a plurality of systems on one long power line as being from a single source In some embodiments, the solar panels are deployed on power lines of the electrical grid for producing solar energy and/or for further exploiting the electromagnetic radiation from the lines for harvesting other forms of energy. The panels, in some embodiments, include a fluid gas with a high thermal conductivity, optionally a high thermal capacity, for example a light gas such as helium or hydrogen, which is heated inside the panels by electromagnetic radiation (e.g., thermal radiation) from the power lines and which may be channeled by the system to an accumulator for heat storage for use in a thermodynamic cycle and/or for consumption, for example for district heating. Optionally, heating of the fluid gas inside the panels is done by generating heat by electric induction due to eddy currents created by, near and/or on the power lines. Optionally, the fluid gas is a fluorescent gas, for example neon, argon, mercury, and the like, which may be activated by the electromagnetic radiation field from the power lines, so that a fluorescent light is generated by the panel and serves for illumination. Optionally, the fluorescent lighting serves for road illumination. Additionally or alternatively, road illumination may be provided by regular road lamps which powered by stored solar power from the solar panels. Alternatively, the fluorescent gas is indirectly activated by an inductor which shoots electrons and is powered by the electromagnetic field. Additionally or alternatively, the fluid gas is helium or any other type of gas lighter than air and with high thermal conductivity, optionally high thermal capacity, which contributes to increasing panel buoyancy reducing weight stresses on system structural supports. Optionally, the fluidic gas is heated by heat from the sun or by wind pressure.

In some cases, connecting a solar panel between two power lines can create problems in the electric grid, and more so where high voltage lines are involved. Dirt, pollution, salt, and particularly water on the surface of the panel can create a conductive path across the panel, causing leakage currents and flashovers between the power lines. The flashover voltage can be more than 50% lower when the insulator is wet.

According to some embodiments of the present invention, leakage and flashover across the panel is substantially eliminated by connecting the panel along a first side to a live cable in the grid (the power line or live power line), and along an opposing second side to a dummy line, the dummy line comprising a cable which is not connected in the electric grid to any power sources. Alternatively, the live cable is a neutral line.

In some embodiments, the panel is equipped with electrically isolated attachment clips or similar for attaching the panel to the power lines in the electric grid. Optionally, the attachment clips are also used to attach the panel to the dummy line. Optionally, the conductors are embedded in the panel itself. Optionally, the power lines include overhead lines in a telephone grid or other overhead communication grids. Optionally, the panel is connected to two power lines, one on each side, and electrically isolated between the two lines.

In some embodiments, the panel is movable by rotating a cantilevered support on the pylon and to which it the panel is attached, so that it may be positioned horizontally, vertically, or inclined at an angle relative to a vertical and horizontal axis, optionally in a direction facing the sun. Optionally, the panel is fixed between the power line and dummy line, or between the neutral line and the dummy line, or hanging on one of the lines and free to swing. Optionally, the panel includes holes to allow air flow through the hole and reduce wind pressure on the panel. Optionally, the holes occupy between 20%-80% of the total area of the panel. Optionally, the panel includes rounded edges and/or includes portions with rounded contours to reduce resistance to airflow. Optionally, the panel is elliptical in shape. Additionally or alternatively, the panel is designed to withstand wind turbulence fluctuations and vibration harmonics. Optionally, a weight distribution of the panel is such that the panel is supported by one or more power lines and/or one or more dummy lines.

In some embodiments, the panel is supported by a support structure. Optionally, the support structure includes tension cables. Optionally, in order to stiffen the grid to wind, transverse vertical and/or diagonal rods are included between the cables for increasing moment of inertial and stiffness. Optionally, to maintain tension in supporting cables (power lines, dummy lines, and/or support structure), insulated tension regulating elements are connected to the support cables. Optionally, a panel width prevents the power lines from breaching regulatory clearances as to the distance to be maintained between the cables.

In some embodiments, the panels extend longitudinally along the length of the grid. Optionally, the panel extends longitudinally from one pylon to an adjacent pylon. Optionally, the panel extends longitudinally along a portion of the length between pylons. Additionally or alternatively, the panels will be of a relatively short length and configured to be inclined in a direction along the length of the grid.

In some embodiments, the panel includes a photovoltaic (PV) module comprising a plurality of photovoltaic (PV) cells attached to an electrically insulating material, for example a flexible membrane sheet such as a single-ply membrane sheet. The photovoltaic modules may include photovoltaic technologies known in the art such as, but not limited to, flexible film amorphous silicon or single crystalline or multi crystalline, arranged side-by-side, end-to-end, or adjacent to each other, or any combination thereof. Additionally or alternatively, the PV modules generate a greater amount of current as a result of the electromagnetic radiation (magnetic field) effect on quantum wells in the PV cells. More information on the effects of magnetic fields on quantum wells is found in "Photo-galvanic effect in asymmetric quantum wells"; K. Majchrowski et al, Journal of Physics: Conference Series 213 (2010) 012033. Optionally, the photovoltaic module is configured for absorbing concentrated solar radiation. Optionally, the modules are adhered to the flexible membrane, and the edges of the modules may include electrical connectors or electrodes which are arranged to face each other or be aligned with each other. Optionally, the electrical connectors are connected by a solder connection to module electrodes through apertures in the surface of the flexible membrane and are connected in series and/or cascade. Optionally, longitudinal edges on the sides of the panel and the ends are hermetically sealed. Additionally or alternatively, the series electrical connectors are connected directly to a DC electric junction box, to a combiner box, to another panel, and/or to the inverter, one or more of which are optionally included in the solar energy harvesting system.

In some embodiment, installed on the panel or on an electric pylon is the inverter. Optionally, a power counter is included in the system, the counter configured to count power supplied to the grid and to connect by telemetry to a monitoring center for reporting faults and the amount of power supplied. Additionally or alternatively, a controller is included in the system to control mechanical and/or electrical functions of the system such as, for example, panel tracking of the sun, data collection including quantity of electricity transfer to the grid, equipment operation monitoring, and fault detection, among others. Optionally, the system delivers current to the grid as an additional power source to the energized grid power or alternatively, as a single power source in the grid. Optionally, the solar harvesting system is designed for use in residential, commercial or industrial building structures connected to the same electric grid, and/or transmitted over a larger grid to remote consumers.

In some embodiments, the panel includes a mechanical cleaning mechanism. Optionally or alternatively, the mechanism includes an electrostatic mechanism, for example, an atomizing solenoid to atomize water droplets and/or to generate a quasi-static field for reducing dust on the panels. Optionally or alternatively, the panel includes a coating for substantially preventing adhering of dirt. Optionally or alternatively, the panel includes spikes, a net, or other means for preventing birds from resting on the panel. Additionally or alternatively, the panel includes a GPS (Global Positioning System) device for tracking a location of the panel, for example in case of theft.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 schematically illustrates a perspective view of an exemplary electrical grid solar harvesting system 100, according to an embodiment of the present invention. System 100 includes three solar panels 102 mounted on power lines. System 100 is configured to collect solar energy and to convert the energy into electricity which is fed into the electrical grid. Optionally, system 100 is additionally configured to utilize electromagnetic radiation generated by power lines 110, 112, and 114 to heat a fluid gas in panels 102 for producing heat which is stored and used for heat conversion and/or consumption. Additionally or alternatively, the electromagnetic radiation is used to produce light. Optionally, system 100 is additionally configured to utilize eddy currents in power lines 110, 112, and 114 to produce heat by induction heating.

In some embodiments, panel 102 includes a flexible insulating material 104 to which are attached PV modules 106. Optionally, panel 102 longitudinally extends substantially a whole distance between two pylons 108, and is attached longitudinally along a first side to a power line, and along an opposing second side to a dummy line. For example, as shown, first panel 102 is attached to power line 110 and to dummy line 116; second panel 102 is attached to power line 112 and to dummy line 116; and third panel 102 is attached to power line 114 and to dummy line 116. Optionally, dummy line 116 may be a same line for two or even three panels 102. Optionally, power lines 110, 112, and 114 and dummy lines 116 are supported at both ends by cantilevered supports 128 in pylons 108, so that panels 102 extend from one support to the other. Additionally or alternatively, this configuration may be repeated in a plurality of locations along the electric grid. Optionally, panels 102 extend along a portion of the distance between pylons 108, while power lines 110, 112, and 114, and dummy lines 116, are supported by support 128.

In some embodiments, cantilevered support 128 is mechanically rotated by a motor 126 at a point of connection with pylon 108. Rotating support 128 pivots panels 102 between a horizontal position and a vertical position for tracking the position of the sun. Optionally, panels 102 are pivoted into a vertical position for substantially preventing accumulation of snow on the panels. Optionally, panels 102 may be pivoted so that they are inverted (upside-down), for substantially preventing dew accumulating on PV modules 106. Optionally, panels 102 may be inverted for applications where PV module 106 includes the ability to collect concentrated solar radiation. Optionally, the solar radiation is concentrated onto a heat pipe (not shown). Optionally, cantilevered support 128 is configured to be lowered to the ground with panels 102 for cleaning, inspection, and other maintenance and/or installation operations.

In some embodiments, system 100 includes a support structure 120 for supporting a weight of panels 102. Optionally, support structure 120 includes a central support cable 118 extending from first pylon 108 to second pylon 108. Optionally, support cable 118 supports panels 102 from above through tension cables 122 extending from the support cable to a transverse rod 124 included in each panel. Transverse rod 124 is designed to provide a transversal stiffness and to prevent panel 102 from collapsing.

Figure 2:
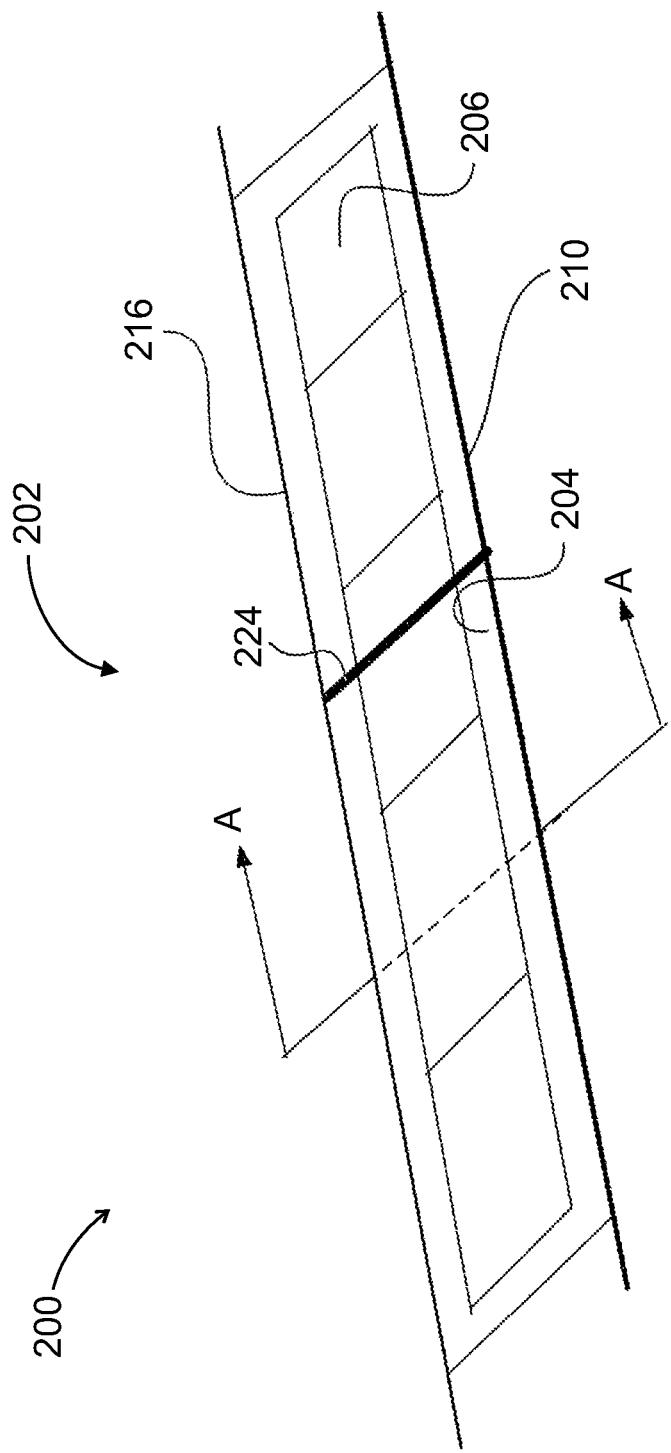
FIG. 2 schematically illustrates a perspective view of an exemplary longitudinal solar panel in an electric grid solar harvesting system, according to some embodiments of the present invention.

Reference is now made to FIG. 2 which schematically illustrates a perspective view of an exemplary longitudinal solar panel 202 in an electric grid solar harvesting system 200, according to some embodiments of the present invention. Optionally, system 200 and solar panel 202 are similar to system 100 and solar panels 102 shown in FIG. 1. For exemplary purposes, solar panel 202 is shown longitudinally attached to power line 210 and dummy line 216, which may be similar to that shown in FIG. 1 at 110 and 116, respectively.

In some embodiments, solar panel 200 includes a plurality of PV modules 206 attached to an insulated flexible membrane sheet 204, the panel strengthened by a transverse rod 224. PV modules 206, sheet 204, and rod 224 may be similar to that shown in FIG. 1 at 106, 104, and 124, respectively. Optionally, flexible membrane sheet 204 is a thin, single ply membrane. Optionally, sheet 204 includes weight reducing holes (not shown). Optionally, sheet 204 includes holes for allowing wind flow through the membrane and reducing panel 202 resistance to the wind. Additionally or alternatively, sheet 204 may be reinforced with longitudinally, transversally and/or diagonally disposed metallic or non-metallic fiber spires, exposed and/or embedded in the sheet, for providing durability to the panel.

In some embodiments, sheet 204 includes a cavity designed to contain a fluid gas. Optionally, the cavity may contain a liquid fluid. Additionally or alternatively, the fluid gas is helium and serves to increase panel 202 buoyancy in air. Optionally, sheet 204 may include foam with closed bubbles filled with helium. Optionally, the fluid gas includes high electrical insulation properties and high thermal conductivity properties. Optionally, panel 202 produces relatively large amounts of heat by heating the fluid gas inside the cavity using induction heating from power line 210. Optionally, the fluid gas exhibits fluorescent properties when exposed to an electromagnetic field. Optionally panel 202 produces fluorescent lighting by electromagnetically radiating the fluorescent gas in the cavity with radiation from power line 210. Optionally, to produce fluorescent lighting dummy line 216 is connected to the neutral line on the electric grid.

In some embodiments, PV modules 206 includes PV technologies known in the art such as, but not limited to, flexible film amorphous silicon or single crystalline or multi crystalline, arranged side-by-side, end-to-end, or adjacent to each other, or any combination thereof. Optionally, PV module 206 is configured to absorb concentrated solar radiation reflected from within the cavity in sheet 204.

Figure 3A:
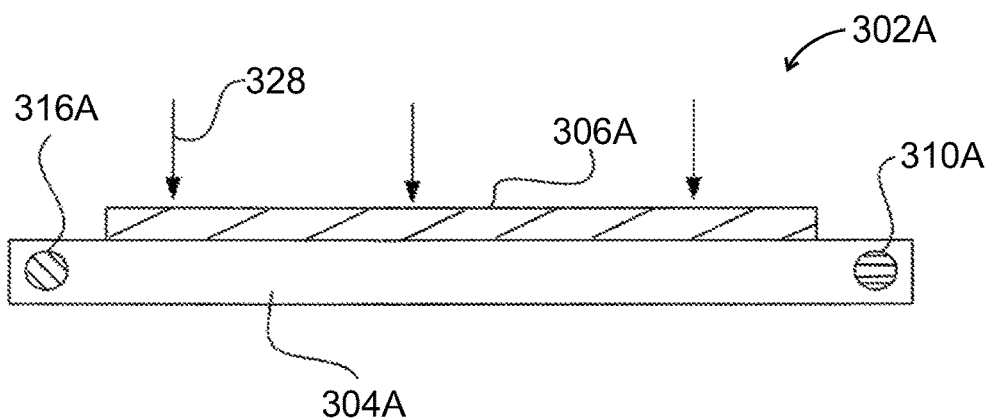
FIGS. 3A-3C schematically illustrate cross-sectional views A-A of exemplary longitudinal solar panels, according to some embodiments of the present invention.
Figure 3B:
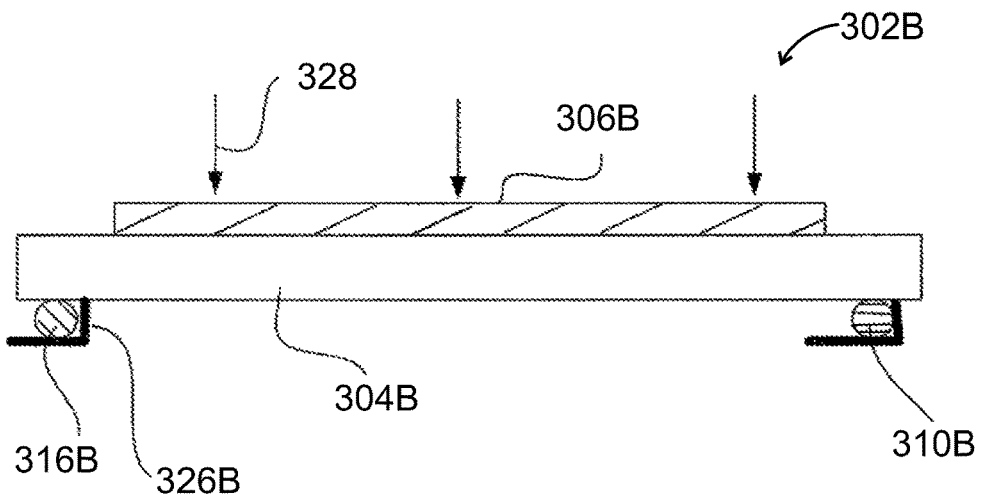
Figure 3C:
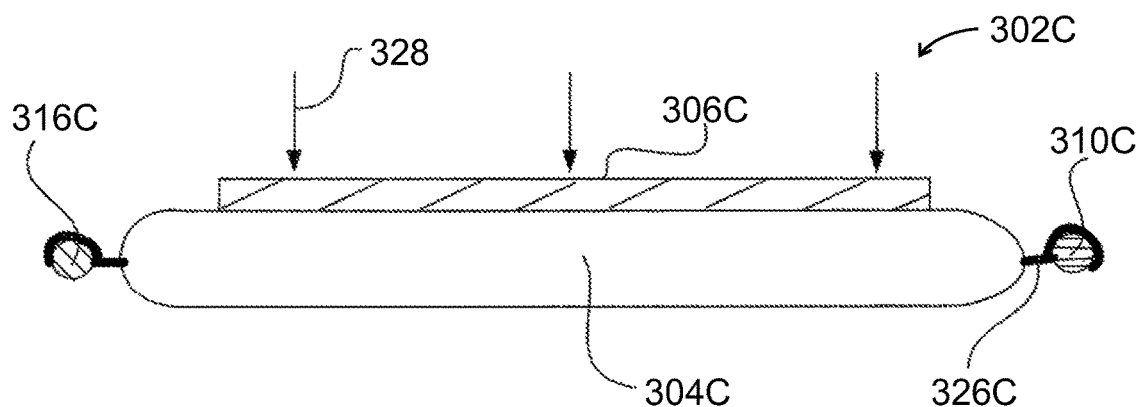

Reference is now made to FIGS. 3A-3C which schematically illustrate cross-sectional views A-A of exemplary longitudinal solar panels 302A, 302B, and 302C, respectively, according to some embodiments of the present invention. The cross-sectional views are from a same direction as shown in FIG. 2 for panel 202.

In FIG. 3A, solar panel 302A includes a PV module 306A and a flexible sheet membrane 304A. Solar panel 302A is optionally similar to panels 102 or 202 in FIG. 1 or 2, respectively, and is configured to generate electricity from solar energy 328 impinging on PV modules 306A. Optionally, power line 310A and dummy line 316A are embedded in sheet 304.

In FIG. 3B, solar panel 302B includes a PV module 306B and a flexible sheet membrane 304B. Solar panel 302B is optionally similar to panels 102 or 202 in FIG. 1 or 2, respectively, and is configured to generate electricity from solar energy 328 impinging on PV modules 306B. Optionally, panel 302B is attached to externally located power line 310B and dummy line 316B by means of isolating clips 326B attached to sheet 304B and which allow the panel to rest on the lines.

In FIG. 3C, solar panel 302C includes a PV module 306C and a flexible sheet membrane 304C. Solar panel 302C is optionally similar to panels 102 or 202 in FIG. 1 or 2, respectively, and is configured to generate electricity from solar energy 328 impinging on PV modules 306C. Optionally, panel 302C is attached to externally located power line 310C and dummy line 316C by means of isolating clips 326C attached to sheet 304C and which support the panel from the side. Optionally, sheet 304C includes rounded edges for improving airflow around the panel.

Figure 4A:
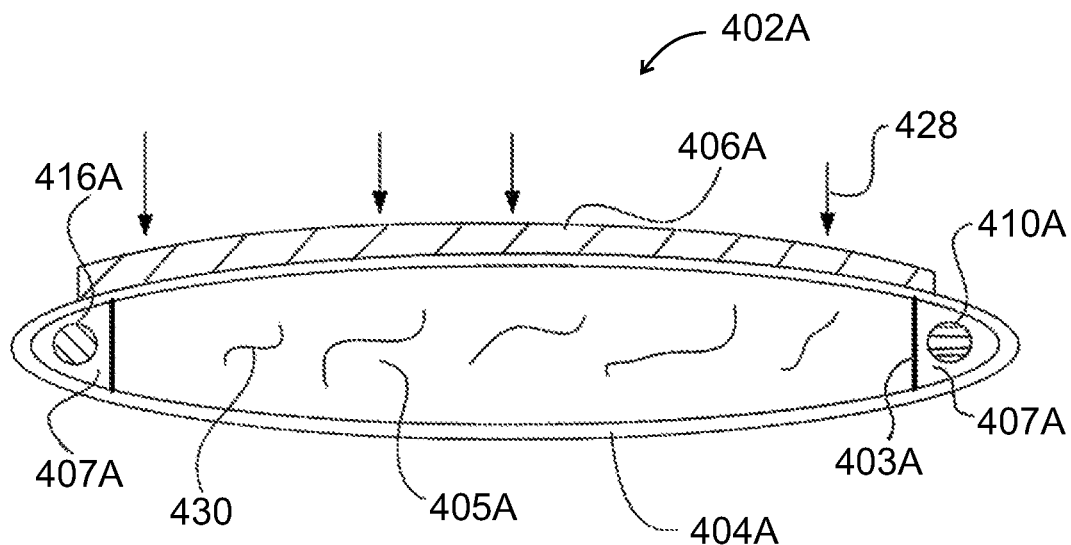
FIGS. 4A and 4B schematically illustrate cross-sectional views A-A of exemplary longitudinal solar panels including a fluid gas, according to some embodiments of the present invention.
Figure 4B:
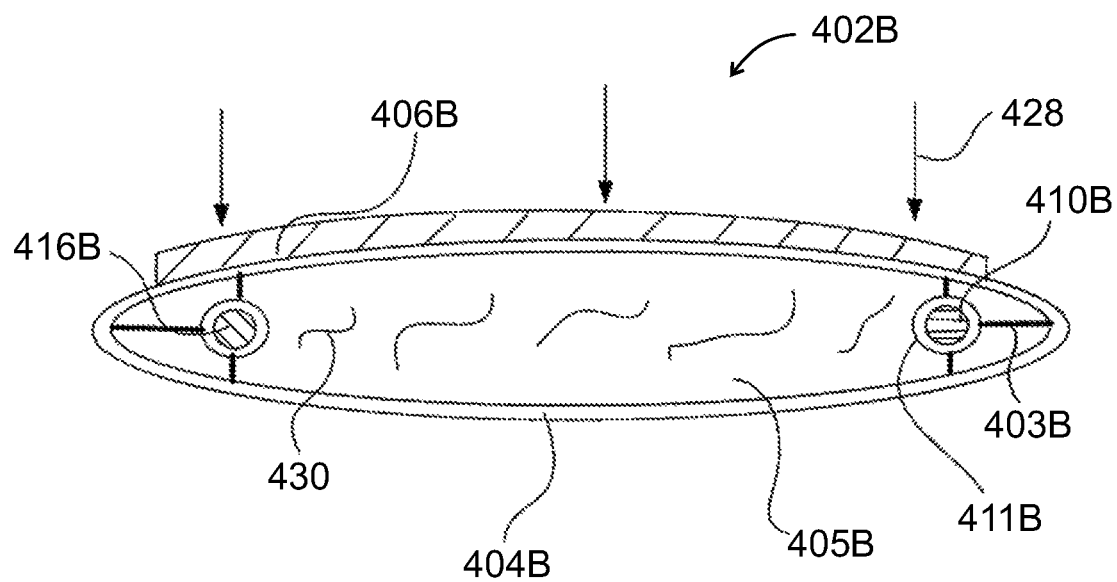

Reference is now made to FIGS. 4A and 4B which schematically illustrate cross-sectional views A-A of exemplary longitudinal solar panels 400A and 400B, respectively, including a fluid gas 430, according to some embodiments of the present invention. The cross-sectional views are from a same direction as shown in FIG. 2 for panel 202. Optionally, solar panels 400A and 400B are elliptically shaped to allow for improved airflow around the panels.

In FIG. 4A, solar panel 402A includes a PV module 406A and a flexible sheet membrane 404A including a cavity 405A with fluid gas 430. Solar panel 402A is optionally similar to panels 102 or 202 in FIG. 1 or 2, respectively, and is configured to generate electricity from solar energy 428 impinging on PV modules 406A. Optionally, solar panel 402A heats fluid gas 430 inside cavity 405A by heat generated from power line 410A from inside a compartment 407A inside the cavity. Optionally, a barrier wall 403A separates power line 410A from the rest of cavity 405A. Optionally, dummy line 416A is similarly located inside cavity 405A inside a separate compartment 407A separated from the rest of the cavity by a second barrier wall 403A. Optionally, power line 410A and dummy line 416A may be located outside panel 402.

In FIG. 4B, solar panel 402B includes a PV module 406B and a flexible sheet membrane 404B including a cavity 405B with fluid gas 430. Solar panel 402B is optionally similar to panels 102 or 202 in FIG. 1 or 2, respectively, and is configured to generate electricity from solar energy 428 impinging on PV modules 406B. Optionally, solar panel 402B heats fluid gas 430 inside cavity 405B by heat generated through induction heating due to eddy currents in power line 410B. Optionally, power line 410B is enclosed within a metal sleeve 411B which heats up due to the induction heating, the sleeve supported inside cavity 405B by electrically isolating supports 403B. Optionally, metal sleeve 411B is of a metal with high thermal conductivity, for example aluminum. Optionally, dummy line 416B is similarly enclosed in a second metal sleeve and supported by electrically isolating supports. Alternatively, dummy line 416B is not enclosed in the metal sleeve.

Figure 5A:
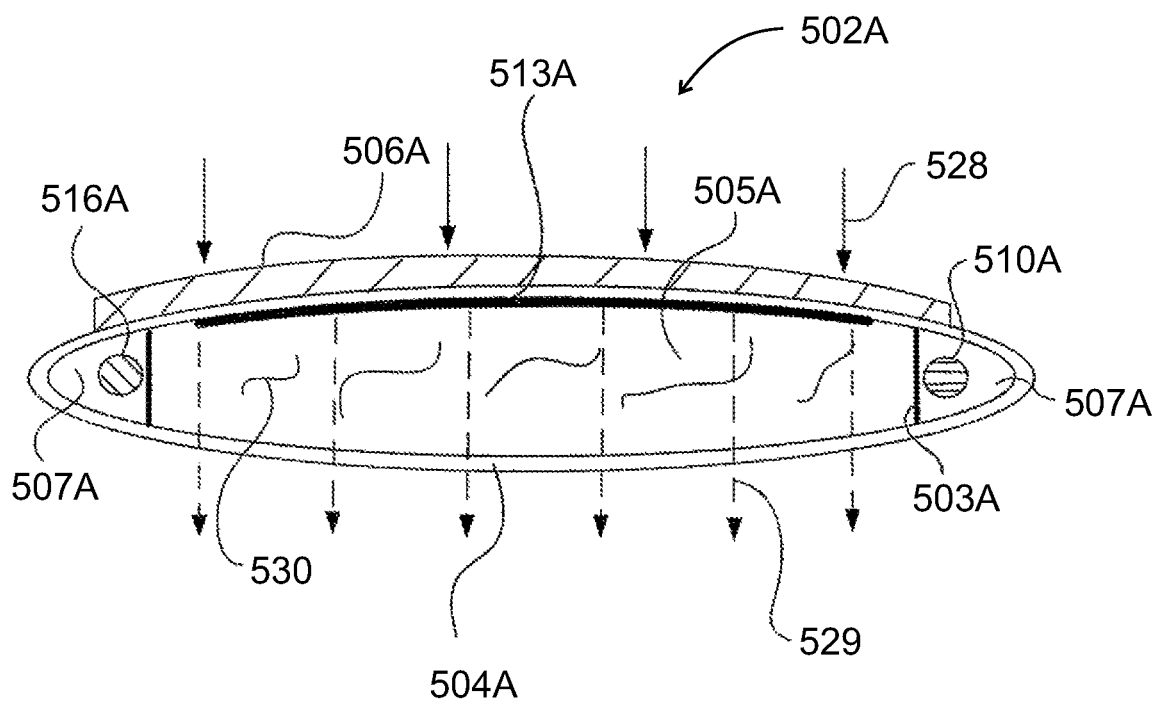
FIGS. 5A and 5B schematically illustrate cross-sectional views A-A of exemplary longitudinal solar panels including a fluorescent gas, according to some embodiments of the present invention.
Figure 5B:
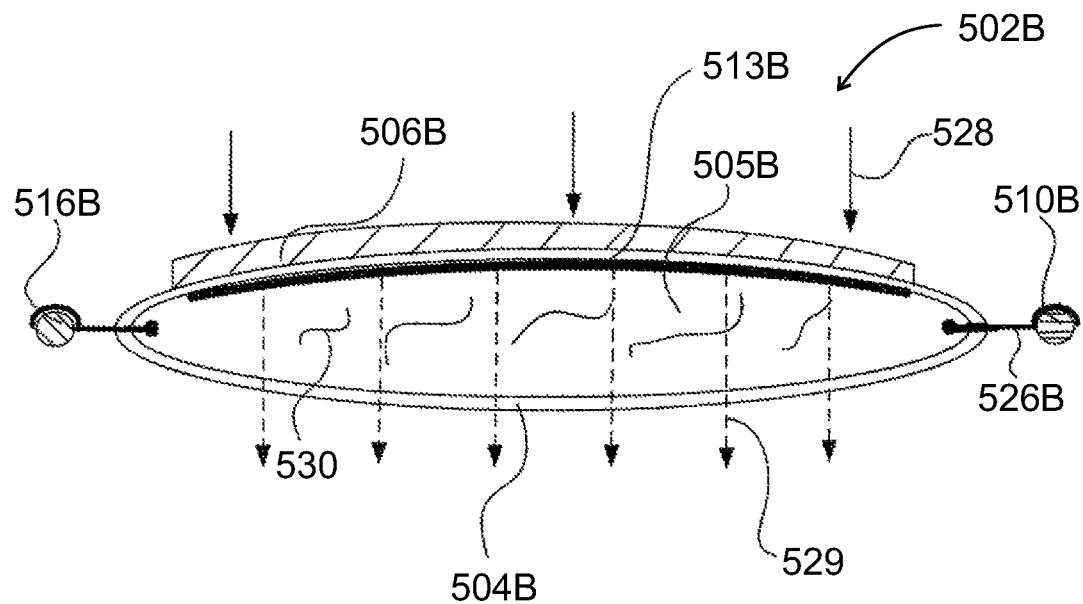

Reference is now made to FIGS. 5A and 5B which schematically illustrate cross-sectional views A-A of exemplary longitudinal solar panels 502A and 502B, respectively, including a fluorescent gas 530, according to some embodiments of the present invention. The cross-sectional views are from a same direction as shown in FIG. 2 for panel 202. Optionally, solar panels 500A and 500B are elliptically shaped to allow for improved airflow around the panels.

In FIG. 5A, solar panel 502A includes a PV module 506A and a flexible sheet membrane 504A including a cavity 505A with a fluorescent gas 530 (for example, when ionized, neon, argon, mercury, krypton, xenon, or combinations thereof). Solar panel 502A is optionally similar to panels 102 or 202 in FIG. 1 or 2, respectively, and is configured to generate electricity from solar energy 528 impinging on PV modules 506A. Optionally, solar panel 502A produces a fluorescent light 529 by exciting gas 530 inside cavity 505A through electromagnetic radiation generated by power line 510A located inside a compartment 507A inside the cavity. Optionally, a barrier wall 503A separates power line 510A from the rest of cavity 505A. Optionally, dummy line 516A is similarly located inside cavity 505A inside a separate compartment 507A separated from the rest of the cavity by a second barrier wall 503A. Optionally, dummy line 516A is connected to the neutral line of the electrical grid (or other 0 volt source).

In some embodiments, sheet 504A is translucent and cavity 505A includes a phosphorescent coating. Optionally, a reflective cover 513A is included inside cavity 505A to direct the light in a predetermined direction, for example, downwards. Optionally, reflective cover 513A is a reflective coating on sheet 504A inside cavity 505A.

In FIG. 5B, solar panel 502B includes a PV module 506B; and a flexible sheet membrane 504B including a cavity 505B with a reflective cover 513B and containing a fluorescent gas 530. Solar panel 502B is similar to solar panel 502A shown in FIG. 5A with the difference that power line 510B and dummy line 516B are externally attached to panel 502B through electrically isolating clips 526B.

Figure 6:
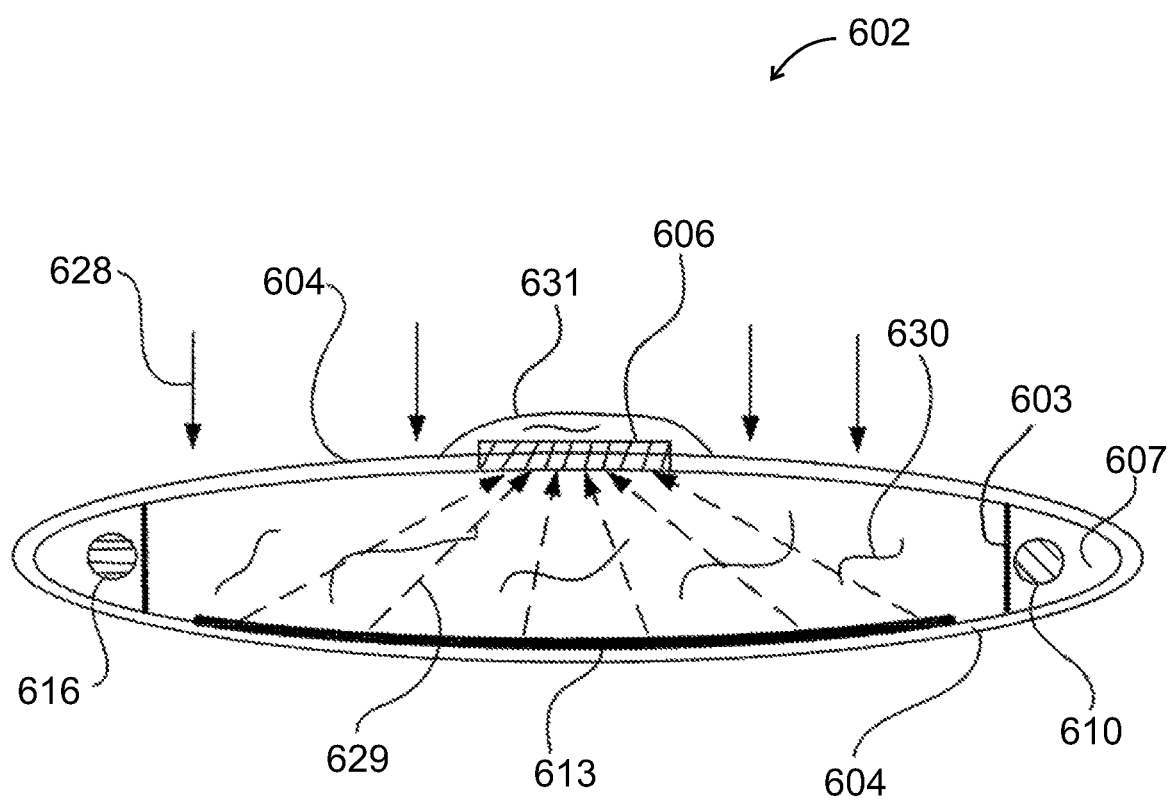
FIG. 6 schematically illustrate a cross-sectional view A-A of an exemplary longitudinal solar panel including a photovoltaic module for concentrated radiation, according to some embodiments of the present invention.

Reference is now made to FIG. 6 which schematically illustrates a cross-sectional view A-A of an exemplary longitudinal solar panel 602 including a photovoltaic module 606 for concentrated radiation, according to some embodiments of the present invention. Optionally, solar panel 602 includes an elliptically shaped cross section to allow for improved airflow around the panel.

In some embodiments, solar panel 602 includes a concentrated radiation PV module 606 and a translucent flexible sheet membrane 604 including a cavity 605 with a fluidic gas 630 such as for example helium Optionally, fluidic gas 630 is used for cooling. Solar panel 602 is optionally similar to panels 102 or 202 in FIG. 1 or 2, respectively, and is configured to generate electricity from solar energy 628 impinging on a reflective cover 613 inside cavity 605, the reflective cover shaped to reflect the impinging light towards PV module 606. Optionally, reflective cover 613 is a reflective coating on sheet 604 inside cavity 605. Optionally, reflective cover 613 is hyperbolically shaped. Optionally, reflective cover includes a fresnell lens with longitudinal strips. Additionally or alternatively, PV module 606 is enclosed within a cap 613 containing the fluid gas for cooling the module.

In some embodiments, power line 610 is located inside a compartment 607 inside cavity 605. Optionally, a barrier wall 603 separates power line 610 from the rest of cavity 605. Optionally, dummy line 616 is similarly located inside cavity 605 inside a separate compartment 607 separated from the rest of the cavity by a second barrier wall 603. Optionally, power line 610 and dummy line 616 may be located outside panel 602.

Figure 7:
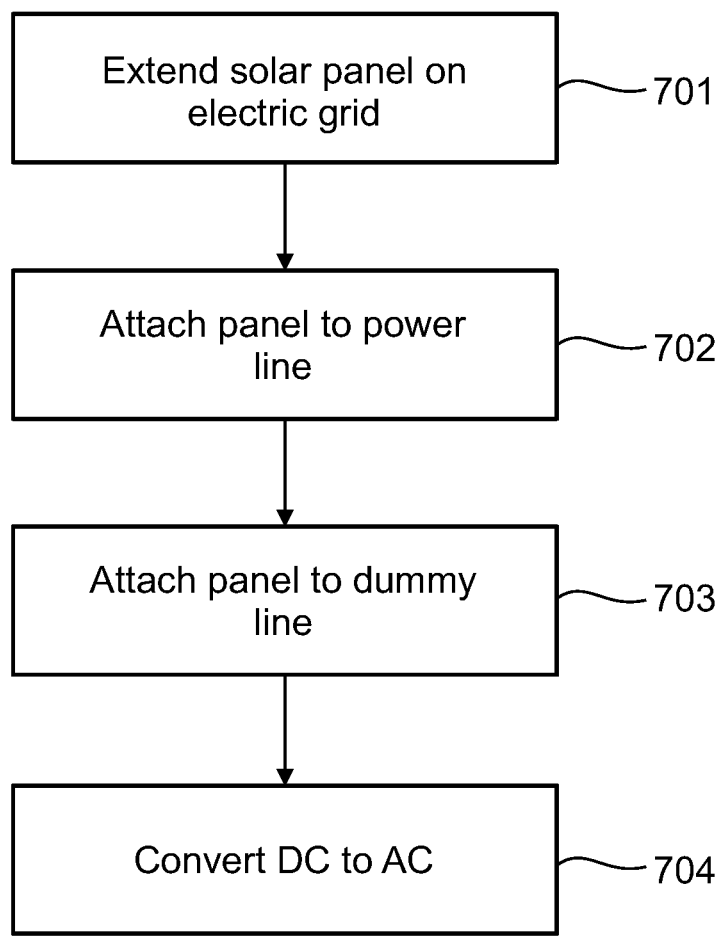
FIG. 7 illustrates a flow chart of a method to produce electricity using an electric grid solar energy harvesting system, according to some embodiments of the invention.

Reference is now made to FIG. 7 which illustrates a flow chart of an exemplary method to produce electricity using electric grid solar energy harvesting system 100 shown in FIG. 1, according to some embodiments of the invention. The method described is for illustrative purposes only, and it should be evident to an ordinary person skilled in the art that there may be other ways of implementing the method and which may include adding steps, removing steps, interchanging steps, and the like.

At 701, optionally, solar panels 102 are extended longitudinally along the grid between pylons 8. Optionally, prior to extending solar panels 102, three dummy lines 116 are extended between cantilevered supports 128. Optionally, motor 126 is actuated for lowering supports 128 to the ground for installation purposes.

At 702, optionally solar panels 102 are attached to power lines 110, 112 and 114. Optionally, panels 102 are attached by means of electrically insulating clips, for example, as shown in FIG. 3B at 326B. Optionally, panels 102 are attached to the power lines using clips similar to that shown in FIG. 3C at 326C.

At 703, optionally solar panels 102 are attached to dummy lines 116. Optionally, panels 102 are attached by means of electrically insulating clips, for example, as shown in FIG. 3B at 326B. Optionally, panels 102 are attached to the power lines using clips similar to that shown in FIG. 3C at 326C.

At 704, solar panels 102 generate DC from collected solar energy. The DC is converted to AC by an inverted and fed into the electric grid. The counter monitors the amount of AC electricity fed.

In some embodiments, where panels 102 are supported by dummy lines 116 and power lines 110, 112 and 114, as shown in FIG. 1, each dummy line connected to a panel side is electrically conductive and is electrically connected to the power line that supports the opposite side of the panel. This way, the potentials in both sides of the panel are equalized and leakage and flashover effects across the panel are eliminated. In some of these embodiments, each dummy line is electrically connected to its mate power line only in one point along the solar system. In other embodiments, each dummy line is electrically connected to its mate power line in more than one point along the solar system. The electrical connection between the dummy and power lines may be of various types such as, but not limited to a short circuit, through a capacitor, inductor, transformer or any applicable combination thereof.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A grid-mounted solar energy harvesting system, wherein the grid is operable to supply AC power independently of the solar energy system, comprising:
    at least two pylons, each pylon having a cantilevered support,
    one or more solar panels longitudinally disposed between the at least two pylons,
    a support cable extending between the at least two pylons,
    tension cables extending downwardly from the support cable to the one or more solar panels,
    wherein at least one of the one or more solar panels is supported by each cantilevered support attached to the at least two pylons, and is electrically conductive and is electrically connected in at least one point along the solar energy harvesting system to a power line.

2. The system of claim 1 wherein the at least one of the one or more solar panels is longitudinally disposed along at least a portion of a length of the cantilevered supports.

3. The system of claim 1, wherein said system is adapted to harvest heat.

4. The system of claim 1, wherein the at least one of the one or more solar panels are configured to emit light.

5. The system of claim 1, wherein the at least one of the one or more solar panels comprises a reflective cover for reflecting solar energy.

6. The system of claim 1, further comprising a clip for attaching the at least one of the one or more solar panels to the support cable.

7. The system of claim 6, wherein the clip comprises an electrically insulating material.

8. The system of claim 1, wherein the at least one of the one or more solar panels comprises a photovoltaic module.

9. The system of claim 8, wherein said photovoltaic module is adapted to concentrate solar energy.

10. The system of claim 8, wherein the photovoltaic module is attached to an electrically insulating material.

11. The system of claim 10, wherein the electrically insulating material comprises an electrically insulating flexible membrane.

12. The system of claim 10, wherein a power cable and dummy cable are embedded in the electrically insulating material.

13. The system of claim 10, wherein the electrically insulating material comprises a cavity containing a fluidic gas.

14. The system of claim 13, wherein the fluidic gas is a lighter-than-air gas.

15. The system of claim 13, wherein the fluidic gas exhibits fluorescent properties.

* * * * *